United States Patent [19]

Peterson

[11] Patent Number: 4,998,670

[45] Date of Patent: Mar. 12, 1991

[54] TRACTION MAT

[76] Inventor: Francis N. Peterson, Box 306, Lake Harmony, Pa. 18624

[21] Appl. No.: 351,205

[22] Filed: May 15, 1989

[51] Int. Cl.$^5$ ............................................. E01B 23/00
[52] U.S. Cl. ........................................ 238/14; 404/35
[58] Field of Search ....................... 238/14; 404/35, 36

[56] References Cited

U.S. PATENT DOCUMENTS

| D. 260,384 | 8/1981 | Jurusz | D12/154 |
| 1,405,051 | 1/1922 | Love | 152/222 |
| 1,594,623 | 8/1926 | Lundberg | 238/14 |
| 1,863,316 | 6/1932 | Webster, Jr. | 238/14 |
| 2,486,911 | 11/1949 | Becker | 238/14 |
| 3,096,939 | 7/1963 | Kalfen | 238/14 |
| 3,425,624 | 2/1968 | Jacobs | 238/14 |
| 3,672,422 | 6/1922 | Greipel | 238/14 |
| 4,121,765 | 10/1978 | Fosteris | 238/14 |
| 4,210,280 | 7/1980 | Reisner | 238/14 |
| 4,211,366 | 7/1980 | Czarnota | 238/14 |
| 4,223,835 | 9/1980 | Witt et al. | 238/14 |
| 4,326,668 | 4/1982 | Granryd | 238/14 |

Primary Examiner—Matthew C. Graham

[57] ABSTRACT

A ribbed traction mat, having a plurality of cup-like cleats on both sides of the mat, will provide increased traction to a vehicle tire stuck in snow, ice, mud, or sand. The mat will provide a gripping surface by seizing both the tire and the ground with the cleats. It will, thereby, provide the necessary traction to free the vehicle.

7 Claims, 1 Drawing Sheet

TRACTION MAT

SUMMARY

My invention relates to traction mats, which are particularly used with rubber tired automotive vehicles. The mat will provide a traction surface to aid in driving the vehicle, under its own power, from a surface such as snow, ice, mud, or sand, which does not offer sufficient traction.

An object of my invention is to provide an improved version of the device mentioned in the above paragraph. The traction device is composed of a rectangular, vinyl-like mat which is flexible and ribbed. On either side of the mat there are suitably spaced, cup shaped, cleates that will provide the necessary traction to free the vehicle from a tractionless surface. The cleates are affixed to one another by rivets.

A principle advantage of my invention, the traction mat, is that it is, very simply, placed against the surface of the tire; adjacent to the portion of the tire which bears on the ground. The initial movement of the tire, due to the gripping effect of the ribbed mat and the cleates, pulls the tire over the traction mat without slipping. Because the mat is made of a flexible material, it will conform to the contour of the ground surface thereby insuring suitable frictional contact.

Another object of this invention is to obtain a traction aid comprising few and low cost elements requiring minimum of tooling expenditures for fabrication.

These and other objects are attained in accordance with the present invention wherein two embodiments of a readily available matting and anchoring means are arranged in a novel combination to insure effective operation.

BRIEF DESCRIPTION OF THE DRAWINGS

The objects and features of my invention may be understood with reference to the following detailed description of an illustrative embodiment of the invention taken together with the accompanying drawings in which:

FIG #1 illustrates a top view of the traction mat;
FIG. #2 illustrates a side view of the traction mat;
FIG. #3 illustrates a top view of the traction cleate;
FIG. 190 4 illustrates a side view of the traction cleate;
FIG. 190 5 illustrates a side view of an automobile tire engaged with the traction mat.

DETAILED DESCRIPTION OF THE DRAWINGS

Figure 1:
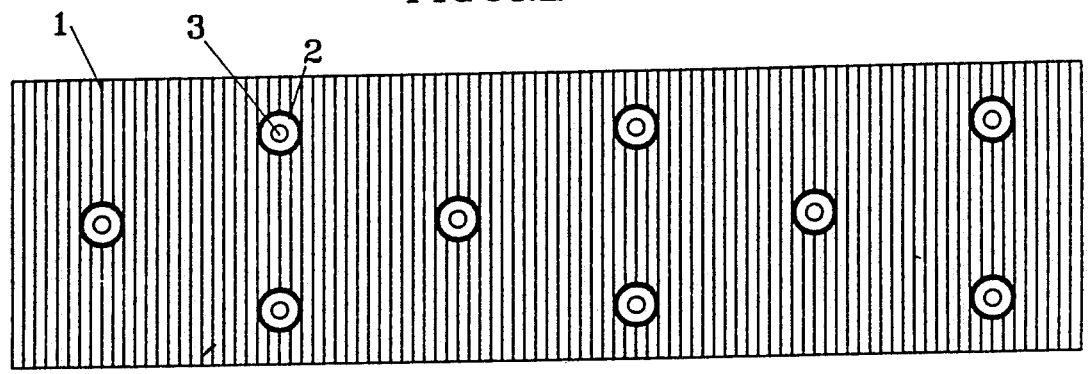
Figure 2:
Figure 3:
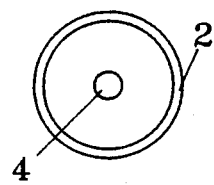
Figure 4:
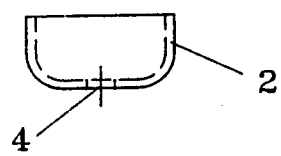
Figure 5:
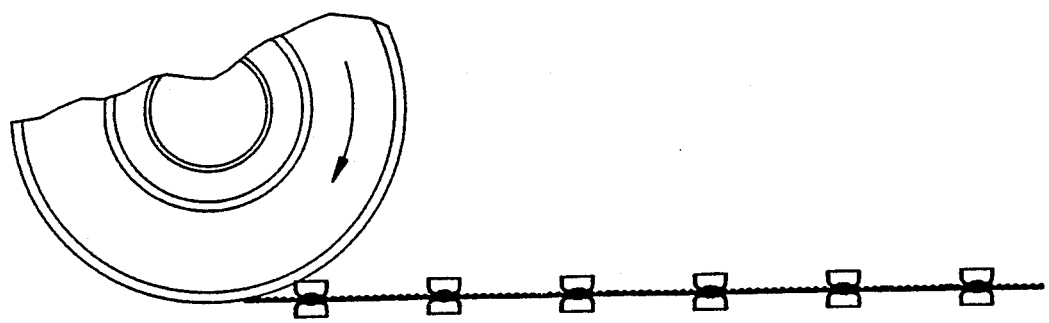

The traction mat of my invention comprises a ribbed, flexible, vinyl-like strip (#1 of FIG. 1), which is embodied with metal cup cleates (#2 of FIG. 1 and FIG. 2), on both sides of the strip as seen in FIG. 2; held together by means of a securing rivet (#3 of FIG. 1 and FIG 2). The cleates of FIG. 1 and FIG. 2 are placed so that once upon the mat there will be sufficient contact with the tire and the road surface. This will enable the wheel to traverse across the mat. FIG. 3 is a top view of an individual cleate which has an unfinished edge (#2 of FIG. 3), for more traction. It also has a hole through which the rivet will penetrate. FIG. 4 is a side view of a single cleate. FIG. 5 shows how the wheel will engage with the mat. The mat need only be placed against the tire so that the single, leading edge cleate, as shown in FIG. I, makes contact with the tire. When the wheel engages slowly, in the direction shown by the arrow, the mat will be drawn under the tire and the tire upon the mat, creating a gripping surface between the tire and the mat and the mat and the road surface. This gripping will enable the wheel to traverse across the mat. The flexibility of the mat allows it to conform to the tire and the road configuration regardless of extremes in outdoor temperatures. As a result, you receive maximum gripping and traction potential.

I claim:

1. A traction mate to obtain traction of an automobile tire on a ground surface of limited friction; said mat comprising a rectangular, flexible, ribbed material which has a plurality of cup shaped cleats that are affixed on both sides of the mat and are riveted together at their bases to form a plurality of cleat pairs; said cleat pairs being affixed in alternating rows of one and two cleat pairs per row and being spaced alternately along a central axis of the mat and equidistant from said central axis.

2. The traction mat referred to in claim 1 wherein the material of the mat is on the type that remains flexible in extremely cold temperatures.

3. The traction mat referred to in claim 1 wherein the ribs of the mat are located on only one side of the said mat such that the ribbed side can be sued facing either the ground or tire surface.

4. The traction mat referred to in claim 1 wherein the cleats have a rough surface edge for gripping the tire or ground surface.

5. The traction mat referred to in claim 1 wherein the surface of the base of each cleat adjacent to the mat has a rounded bottom to prevent it from cutting into the mat.

6. The traction mat according claim 1 wherein the first row of clear pair adjacent to a leading edge comprises a row of one cleat pair to feed the tire on to the mat and the mat under the tire.

7. The traction mat referred to in claim 1 wherein the cleat pairs are independently secured to the said traction mat to thereby conform to any configuration of road surface.

* * * * *